United States Patent
Jung (10) Patent No.: US 9,516,095 B2
(45) Date of Patent: Dec. 6, 2016

(54) DATA MANAGEMENT SYSTEM AND METHOD FOR DISPLAYING DATA

(75) Inventor: Bosun Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 191 days.

(21) Appl. No.: 13/525,945

(22) Filed: Jun. 18, 2012

(65) Prior Publication Data

US 2012/0324026 A1    Dec. 20, 2012

(30) Foreign Application Priority Data

Jun. 17, 2011   (KR) ......................... 10-2011-0058924

(51) Int. Cl.
*G06F 15/16* (2006.01)
*H04L 29/08* (2006.01)

(52) U.S. Cl.
CPC ............. *H04L 67/10* (2013.01); *H04L 67/306* (2013.01)

(58) Field of Classification Search
CPC ......... H04L 67/10; H04L 67/306; G06F 15/16
See application file for complete search history.

(56) References Cited

U.S. PATENT DOCUMENTS

| | | | | |
|---|---|---|---|---|
| 6,621,801 | B1 * | 9/2003 | Wright | H04B 7/18582 370/319 |
| 7,437,369 | B2 * | 10/2008 | Allen | G06F 17/30554 |
| 7,848,362 | B2 * | 12/2010 | Picard | G01D 4/004 370/350 |
| 8,799,375 | B1 * | 8/2014 | Aharoni | H04L 63/0823 709/206 |
| 2007/0135099 | A1 * | 6/2007 | Taylor | G06F 17/3089 455/412.1 |
| 2009/0118596 | A1 * | 5/2009 | Khanuja et al. | 600/301 |
| 2011/0191337 | A1 * | 8/2011 | Cort | G06F 3/048 707/728 |
| 2011/0219135 | A1 * | 9/2011 | Minamizawa et al. | 709/230 |
| 2011/0225640 | A1 * | 9/2011 | Ganapathy | H04W 12/06 726/8 |

(Continued)

FOREIGN PATENT DOCUMENTS

KR    1020030015940    2/2003

OTHER PUBLICATIONS

James Serra Master Data Management (MDM) Hub architecture Jan. 8, 2013.*

(Continued)

*Primary Examiner* — Arvin Eskandarnia
(74) *Attorney, Agent, or Firm* — The Farrell Law Firm, P.C.

(57) ABSTRACT

A user information management method for a hub server connected to a terminal and service provider server, the method including registering user information for the terminal or the service provider server, receiving history information including data created by a user from the registered terminal or the registered service provider server, storing integrated history information obtained by sorting the received history information based on the user information, and transmitting the integrated history information in response to an integrated history information request message received from the registered terminal. Thus, the user can check the functions executed by the terminals owned by the user in an integrated manner and the data generated by multiple diverse terminals and service provider servers are managed in an efficient and integrated manner.

13 Claims, 10 Drawing Sheets

(56) References Cited

U.S. PATENT DOCUMENTS

2011/0235108 A1* 9/2011 Kato .................... G06F 3/1218
                                                358/1.15
2012/0084665 A1* 4/2012 Bookstaff ......... G06F 17/30867
                                                715/748
2012/0136852 A1* 5/2012 Geller .......................... 707/722

OTHER PUBLICATIONS

Roger Wolter Master Data Management (MDM) Hub architecture Apr. 2007.*
Korean Office Action dated Oct. 14, 2016 issued in counterpart application No. 10-2011-0058924, 10 pages.

* cited by examiner

DATA MANAGEMENT SYSTEM AND METHOD FOR DISPLAYING DATA

PRIORITY

This application claims priority under 35 U.S.C. §119(a) to a Korean patent application filed on Jun. 17, 2011 in the Korean Intellectual Property Office and assigned Serial No. 10-2011-0058924, the entire disclosure of which is incorporated herein by reference.

BACKGROUND OF THE INVENTION

1. Field of the Invention

The present invention relates generally to a data management system and method for displaying data in a system and more particularly, to a data management system including a plurality of terminals, a service provider server for providing various services such as Social Network Server (SNS), and a portable server for storing the data generated by the terminals, and a method for displaying the data generated by the terminal and service provider server in an integrated manner in the system.

2. Description of the Related Art

Many diverse mobile devices have been developed and widely used to provide convenience to the user. Recent advances in communication technologies have made inter-device data sharing easy and inter-device data sharing can be implemented using an external device such as an external hard disk and web-based hard disk, providing a user with access to data shared among multiple devices regardless of where the user is located and which device the user uses. However, the inter-device data sharing is problematic in that the limited storage space of the devices require direct or indirect connection among the devices for sharing data. The data sharing service such as a cloud sharing service has been introduced to solve this problem by allowing the user to upload the data stored in the devices to the cloud service and access and download the data whenever and wherever necessary.

However, the conventional cloud service is provided in such a way that the user uploads the data selectively and requests for specific data. This method is inconvenient in that the user cannot check which device has uploaded the data to use. Another drawback of the conventional cloud service is that the utilization of the data uploaded to the cloud service is significantly restricted.

SUMMARY OF THE INVENTION

Accordingly, the present invention has been made in view of the above mentioned problems and/or disadvantages, and according to one aspect of the present invention, there is provided a data management system and a method displaying the data shared by the system.

According to an aspect of the present invention, a user information management method for a hub server connected to a terminal and service provider server is provided, the method including registering user information for the terminal or the service provider server, receiving history information including data created by a user from the registered terminal or the registered service provider server, storing integrated history information obtained by sorting the received history information based on the user information, and transmitting the integrated history information in response to an integrated history information request message received from the registered terminal.

According to another aspect of the present invention, a server apparatus connected to a terminal and a service provider server to manage information on a user is provided, the apparatus including a transceiver, configured to receive user registration information for the terminal or the service provider server and history information including data created by the user from the terminal and the service provider server, a controller, configured to register the terminal and the service provider server based on the user registration information, and a storage unit, configured to store integrated history information obtained by sorting the history information by the user registration information, wherein the transceiver transmits the integrated history information stored in the storage unit in response to an integrated history information request message received from the terminal.

According to another aspect of the present invention, a user information management method of a terminal connected to a hub server is provided, the method including transmitting user information for the terminal to the hub server, transmitting history information including data created by the user to the hub server, and receiving integrated history information sorted by the user information from the hub server.

According to another aspect of the present invention, a terminal connected to a hub server to manage user information, the terminal including a transceiver and a control unit configured to control the transceiver to transmit user information for the terminal and history information including data created by a user to the hub server and to receive integrated history information sorted by the user information.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Various embodiments of the present invention are described in detail with reference to the accompanying drawings. Well known techniques, elements, structures, and processes will be omitted to avoid obscuring the subject matter of the present invention.

In the following description, the term "terminal" refers to an information processing device that is capable of processing the data received and data to be transmitted. The terminal can store and process various types of data. The terminal may be a desktop Personal Computer (PC), a laptop PC, a tablet PC, or a mobile communication terminal such as smartphone.

The term "history information" refers to the information regarding the data including creation date, type of the device on which the data has been created, and address of the data in the terminal or service provider server. The term "integrated history information" refers to integrated history information of all data stored in terminals owned by the user or uploaded to the service provider server with which the user has been registered.

Figure 1:
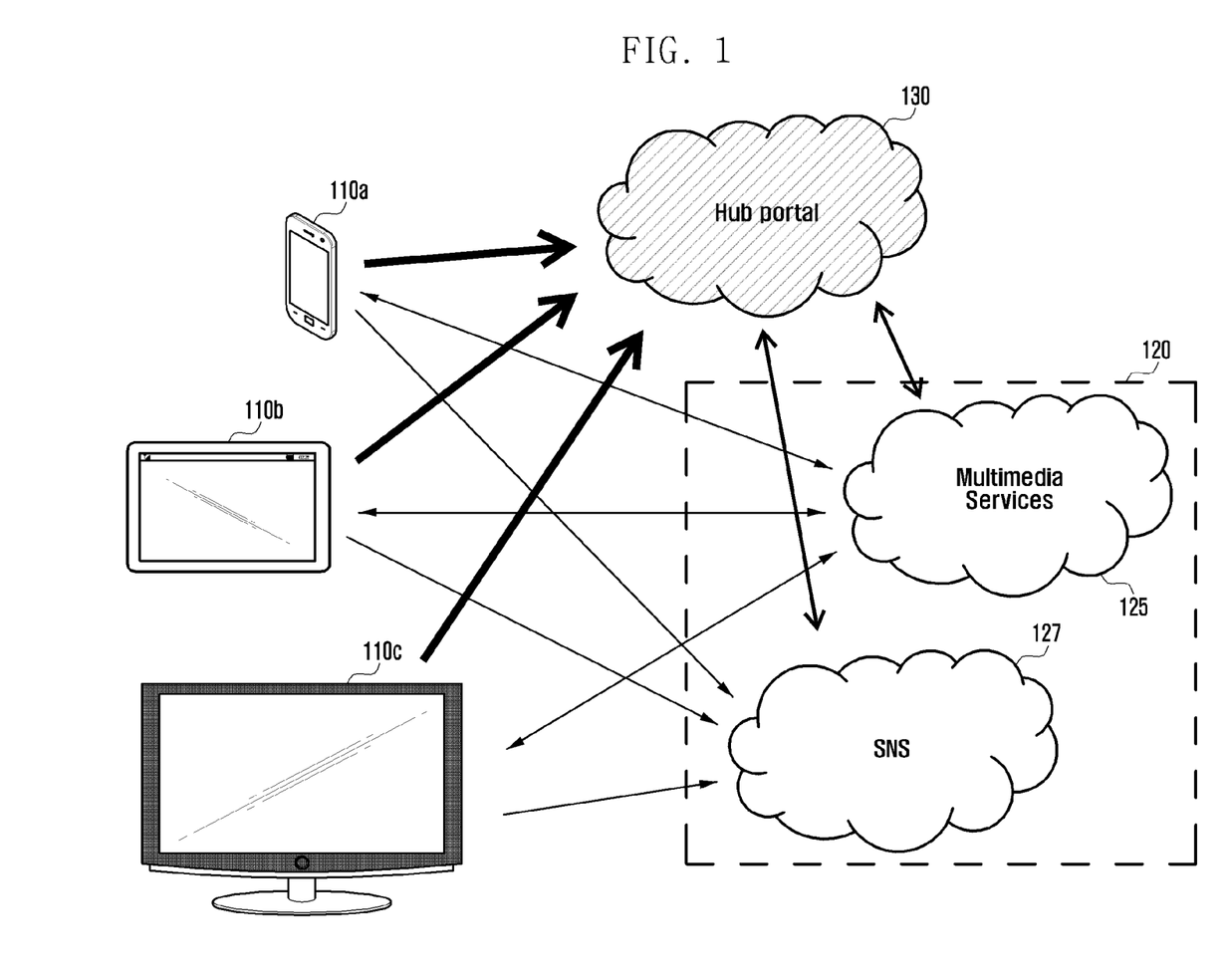
FIG. 1 is a diagram illustrating a data management system according to an embodiment of the present invention.

FIG. 1 is a diagram illustrating a data management system according to an embodiment of the present invention.

As illustrated in FIG. 1, the data management system includes at least one terminal 110a, 110b, and 110c, a service provider server 120, and a hub portal 130.

Each terminal 110a, 110b, and 110c is a terminal regularly used by a user and capable of processing various formats of data. In this description, each terminal is also referred to as a user-specific terminal. The user-specific terminal can communicate data with other terminals and upload and download data to and from the service provider server and hub portal. The data management system described herein includes user-specific terminals such as a mobile communication terminal 110a, a tablet PC 110b, and a TV 110c.

The service provider server 120 is the server providing the user-specific terminals with various services. The service provider server 120 supports a multimedia service 125 for providing multimedia data such as video data and a Social Networking Service (SNS) 127 for providing personal media and information sharing. Examples of multimedia provision servers include the Youtube® server and the Africa TV (atreeca Tv) server. Examples of SNS provision servers include the Twitter® server, the Myspace® server, and the Facebook® server. In order to use such services, the user registers the user-specific terminal with the service provider server 120. The service provider server 120 saves the user information input during the user registration process. If the user inputs the user information to the corresponding service provider sever 120 through the user-specific terminal, the service provider server 120 provides the corresponding user with services such as multimedia service 125 and SNS 127.

The hub portal 130 manages the user-specific data uploaded by the user-specific terminal 110a, 110b, and 110c and the service provider server 120. The user registers the user information with the hub portal 130 to upload data to the hub portal 130. That is, the user creates an account in the hub portal 130 with a user ID or other identity information such as an email address. The user additionally registers the identity information on the user-specific terminal. The identity information of the terminal includes a telephone number, IP address assigned to the terminal, terminal model code, and serial number. The user can also configure a terminal-specific name during registration of the user-specific terminal with the hub portal 130.

The hub portal 130 saves the registered user information. The hub portal 130 also saves the data uploaded from the terminals 110a, 110b, and 110c and the service provider server 120 per each user. Here, the hub portal 130 receives the data and connection information of the terminal from the registered service provider server 120 using an authentication method such as an "Oauth" and "Open ID" authentication methods. The service provider server 120 provides various data according to the data publishing information provided by the service provider server 120.

The hub portal 130 checks the terminal created the uploaded data, service provider server, creation time, and description on the data. The hub portal 130 saves the terminal created the uploaded data, service provider server, creation time, and description on the data as integrated history information. Although in this description, the hub portal 130 checks the uploaded data and saves the data as integrated history information, when data is uploaded, the user-specific terminals 110a, 110b, and 110c can also upload the history information on the corresponding data. When user-specific terminal 110a, 110b, and 110c upload data to the service provider server 120, the service provider server 120 generates the history information on the uploaded data and transmits the history information to the hub portal 130 along with the data.

Subsequently, if the user-specific terminal 110a, 110b, and 110c requests for the stored history information, the hub portal 130 checks the user information on the owner of the user-specific terminal 110a, 110b, and 110c and sends the integrated history information corresponding to the identified user information, to the user-specific terminal requesting the integrated history information. Here, the hub portal 130 transmits the integrated history information in thumbnail format.

Through the data management system described above, the user checks all of the data created by the terminal owned by the user in one place, as further described with reference to FIG. 2.

Figure 2:
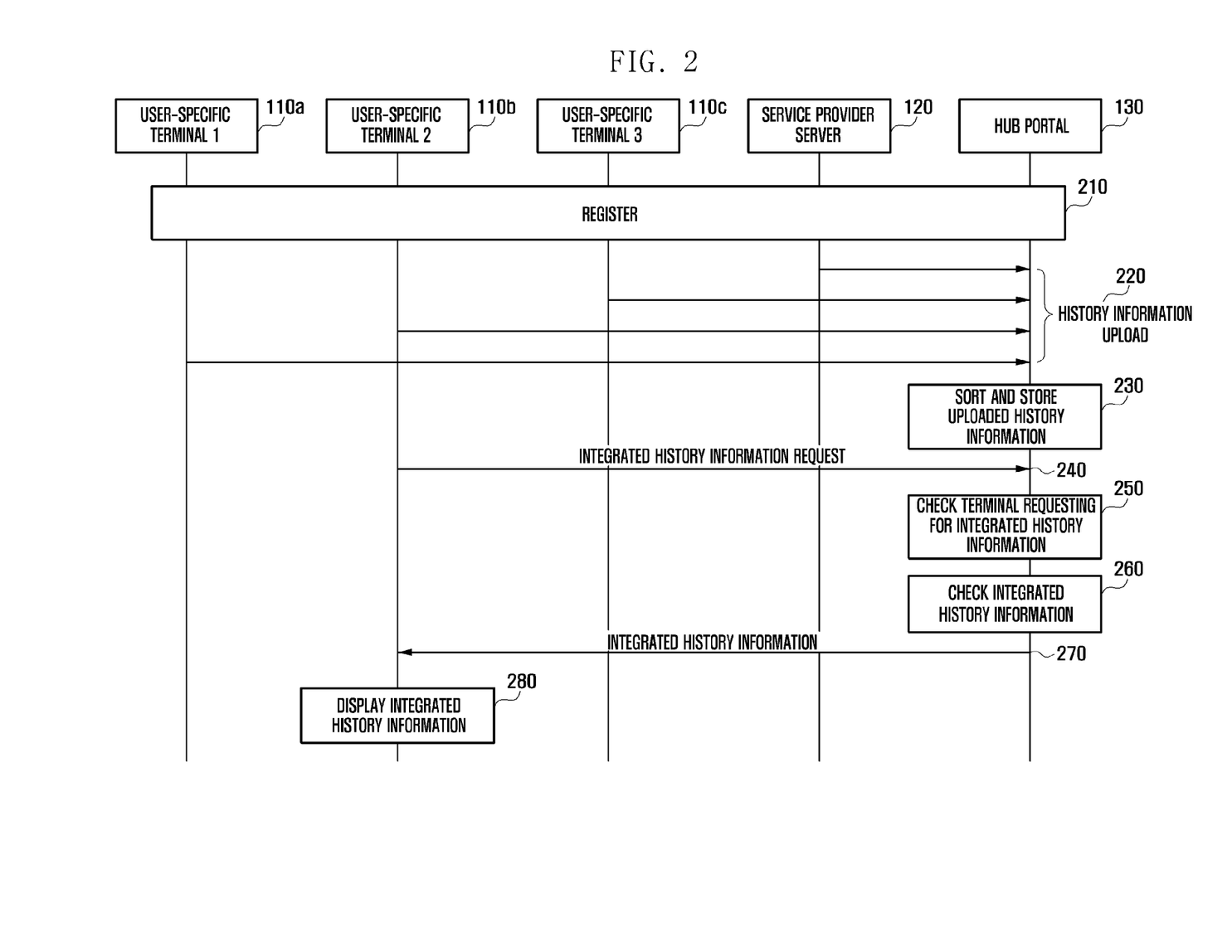
FIG. 2 is a signaling diagram illustrating signal illustrating the signal flows among the entities constituting the data management system according to an embodiment of the present invention.

FIG. 2 is a signaling diagram illustrating the signal flows among the entities constituting the data management system according to an embodiment of the present invention. FIG. 1 is directed to the case where one user uses the service provided by the service provider server 120 using the user-specific terminal 1 110a, user-specific terminal 2 110b, and user-specific terminal 3 110c.

Referring to FIG. 2, the user registers the user-specific terminal 1 110a, user-specific terminal 2 110b, and user-specific terminal 110c with the hub portal 130 along with user information registered with the service provider server 120 in Step 210. The user registers with the hub portal 130 using a newly created ID or an email address. In order to register a terminal with the hub portal 130, the user terminal provides terminal identity information such as a unique terminal ID, Media Access Control (MAC) address, and serial number along with a name input by the user for user convenience. Also, the service provider server 120 can be registered with the Uniform Resource Locator (URL) address of the corresponding service provider server.

The user-specific terminal 110a, 110b, and 110c and the service provider server 120 upload the history information on the data created by the user to the hub portal in Step 220. The history information includes the terminal in which the data is created, service provider server, creation time, data description, and address of the data in the terminal or service provider server. Subsequently, the user can download the data from the corresponding terminal or service provider server using the data address without the involvement of the hub portal.

Although the history information is described as uploaded by the user-specific terminals 110a, 110b, and 110c, and the service provider server 120, the history information may also be transmitted as data is created, by the user-specific terminals 110a, 110b, and 110c, and the service provider server 120 transmitting the created data to the hub portal 130. The hub portal 130 checks the information on the data transmitted by the user-specific terminals 110a, 110b, and 110c, and the service provider server 120 and stores this as the history information. That is, the history information on data uploaded to the hub portal 130 can be carried out immediately upon the creation of each history data or in response to a request by the hub portal or periodically at a predetermined interval.

The hub portal 130 saves the uploaded history information as sorted by a registered user in Step 230. Further, the hub portal 130 sorts the history information by creation time and sorts the data corresponding to the history information by terminal. Subsequently, if an integrated history information request message is received from the user-specific terminal 2 110b in Step 240, the hub portal 130 checks the terminal requesting for the integrated history information in Step 250. Here, the integrated history information request message includes the information on the user requesting the history information or the identity information of the terminal registered with the hub portal 130. The hub portal 130 can retrieve the information on the corresponding user among the registered users.

The hub portal 130 checks the history information per terminal and per service provider server corresponding to the identified user information in Step 260. Subsequently, the hub portal 130 transmits all of the retrieved history information to the user-specific terminal 2 110b which has requested for the integrated history information in Step 270. Upon receipt of the history information, the user-specific terminal 2 110b displays the integrated history information transmitted by the hub portal on the display in Step 280. Although the user-specific terminal 2 110b transmits the integrated history information request message, as described above, any of the terminals connectable to the hub portal, although not registered to the hub portal 130, can also transmit the integrated history information request. Thus, the hub portal 130 checks the user information included in the integrated history information request message and transmits the corresponding history information.

Figure 3:
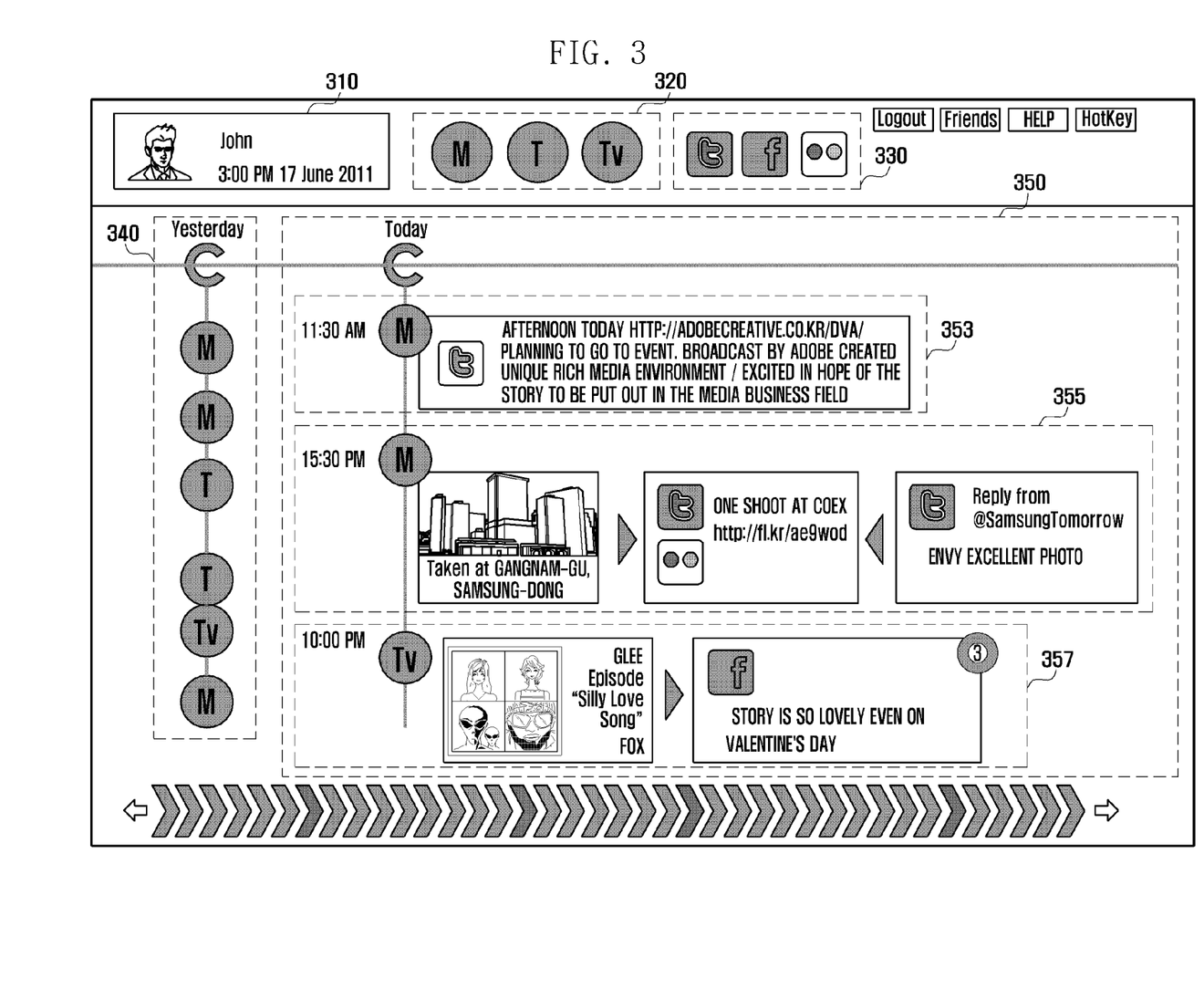
FIG. 3 is a diagram illustrating a data display screen provided in the data management system according to an embodiment of the present invention.

FIG. 3 is a diagram illustrating a data display screen provided in the data management system according to an embodiment of the present invention.

Referring to FIG. 3, the integrated history information provided by the hub portal is displayed in the integrated history display window as illustrated in FIG. 3. Specifically, the integrated history information display window includes a user information display region 310 for displaying information on the user requesting the integrated history information, a terminal information display region 320 for displaying the information on the terminals registered with the hub portal by the user, a service provider server display region 330 for displaying the information on the service provider server registered with the hub portal by the user, and at least one history information display region 340 and 350 for displaying the history information ordered by creation time of history information.

The user information region 310 displays the picture and a name of the user saved in the user's registration process with the hub portal. At the terminal information display region 320, "M" refers to the mobile communication terminal, "T" to the tablet PC, and "Tv" to the television. The terminals are presented at the terminal information display region 320 in various manners. Thus, each terminal is represented by an abbreviation, a device name set by the user, and an image icon representing the corresponding terminal.

The service provider server display region 330 displays the information on the service provider server registered by the user in the registration process with the hub portal. For example, if the user is registered with a service provider server such as Twitter®, Facebook®, and Youtube® servers, the icon representing the service provider server is presented in the service provider server display region 330.

The history information display regions 340 and 350 display the received history information ordered by creation time of the corresponding data. The history information regions also display the type of the terminal associated with the corresponding history information in the form of an icon. The history information display regions 340 and 350 also displays the detailed description of the data corresponding to the history information selected among the history information presented therein.

Specifically, the first history information display region 340 displays the history information created a day before the current time and date, ordered by creation time. The second history information display region 350 displays the history information created on the current date and ordered by creation time. Here, the history information displayed in the history information display regions 340 and 350 is provided with the icons representing the types of the respective terminals that created the history information and the service provider server.

For example, if the user has posted a text to the Twitter page through the mobile communication terminal at 11:30 AM on 17 Jun. 2011 and thus the history information on this has been uploaded to the hub portal, then the data creation date, type of the terminal, and the description on the data are displayed in the second history information display region 350 as the first history information 353.

As another example, if the user has taken a photo with the camera of the mobile communication to post the photo to the Twitter page through the mobile communication terminal at 15:30 PM on 17 Jun. 2011 and another user has posted a reply such that the history information has been uploaded on the hub portal, then the creation date of the data, type of terminal, description on the data, and the detail of the reply posted the other user are displayed in the second history information display region as the second history information 350.

As another example, if the user has posted an appreciation of a TV program to the Twitter page at 10 PM on 17 Jun. 2011 while watching the TV program such that the history information on this has been uploaded to the portal, then the creation date of the data, type of terminal, detailed description of the TV program, and detail of the appreciation are displayed in the second history information display region 350 as the third history information 357.

The screen image illustrated in FIG. 3 is one example of a screen according to an embodiment of the present invention. The integrated history information on all of the data created through the user-specific terminal is displayed in various ways depending on the selection of the terminal manufacturer, the communication service provider, and hub portal service provider.

Figure 4:
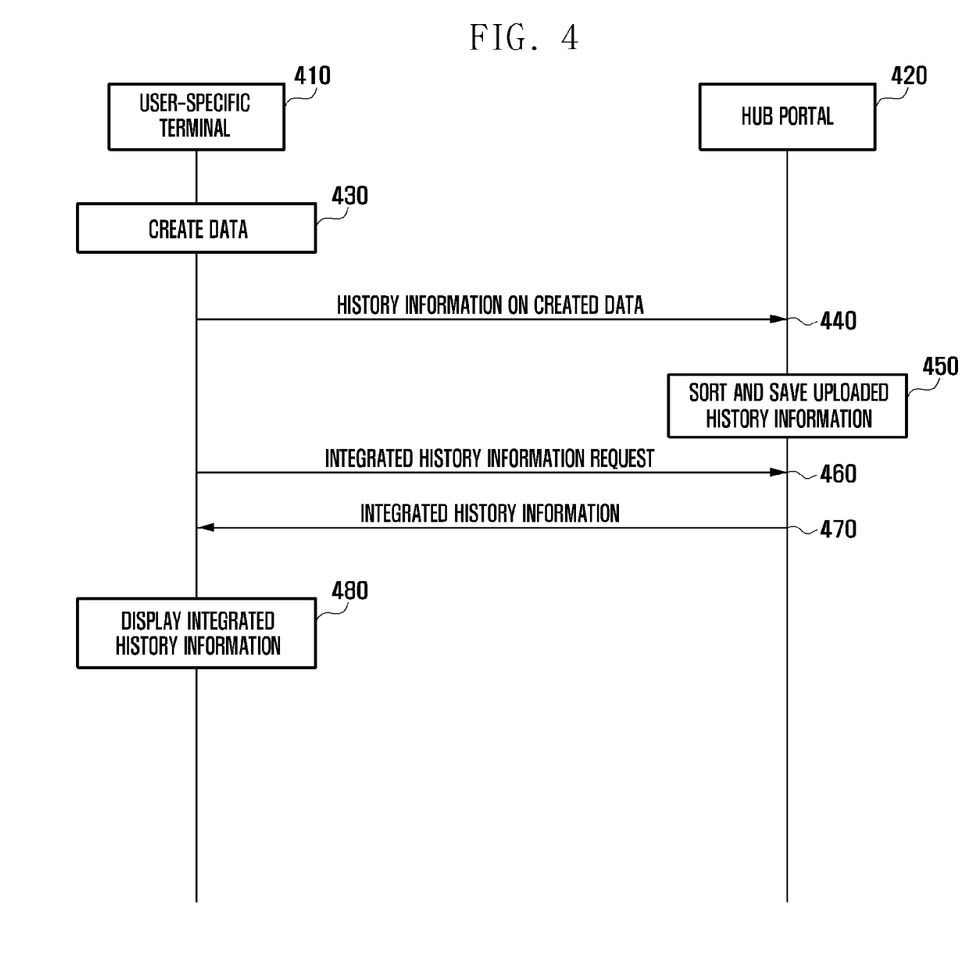
FIG. 4 is a signaling diagram illustrating signal flows among the entities of the data management system in the data display method according to an embodiment of the present invention.

FIG. 4 is a signaling diagram illustrating signal flows among the entities of the data management system in the data display method according to an embodiment of the present invention. FIG. 4 is directed to the method for display history information on the data generated by a user-specific terminal.

Referring to FIG. 4, the user terminal 410 generates the data through the function executed by the user selectively in Step 430. The generated data can be picture data such as a photograph, motion picture data, and text data, supported by the terminal. The user-specific terminal 410 uploads the history information corresponding to the created data to the hub portal 420 in Step 440. The user-specific terminal 410 uploads the user information on the owner of the user-specific terminal 401 along with the history information. The user-specific terminal 410 also uploads the history data immediately upon its creation or periodically or in response to the upload request from the hub portal 420.

The hub portal 420 sorts the uploaded history information by user information and saves the sorted history information in Step 450. The hub portal 420 saves the uploaded history information by creation time and by terminal.

Subsequently, if an integrated history information request message is received from the user-specific terminal 410 in Step 460, the hub portal 420 provides the corresponding user-specific terminal 410 with the requested integrated history information in Step 470. Here, the integrated history request message includes the user information on the owner of the user-specific terminal 410. The hub portal 420 retrieves the integrated history information based on the user information and transmit the retrieved history information. The user-specific terminal 410 displays the integrated history information received from the hub portal 420 in Step 480. The integrated history information includes the creation time of the data corresponding to the history information, terminal information, and detailed description of the data.

Figure 5:
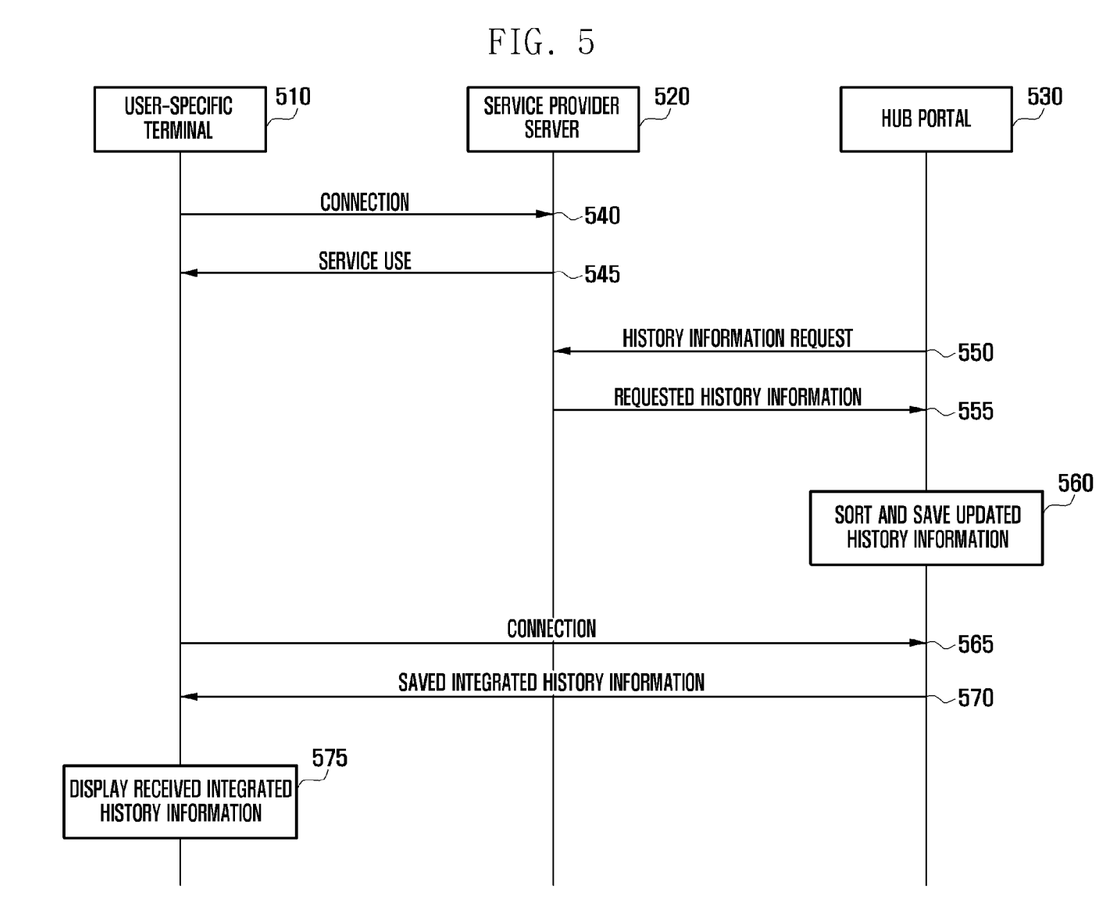
FIG. 5 is a signaling diagram illustrating signal flows among the entities of the data management system in the data display method according to an embodiment of the present invention.

FIG. 5 is a signaling diagram illustrating signal flows among the entities of the data management system in the data display method according to an embodiment of the present invention. FIG. 5 is directed to the method for uploading history information on the data created by the user-specific terminal uses the service provided by the service provider server.

Referring to FIG. 5, the user-specific terminal 510 connects to the service provider server 520 in Step 540. Here, the user-specific terminal 510 transmits user information registered with the service provider server 520 to request for the connection. If the connection is allowed based on the user information, the user-specific terminal 510 connects to the service provider server 520.

After establishing the connection to the service provider server 520, the user-specific terminal 510 uses the service provided by the service provider server 520 in Step 545. Here, the service provided by the service provider server includes video service and SNS. Although not depicted in the drawing, the service provider server 520 saves the data created in the middle of providing the service. The service provider server 520 also generates the history information of the saved data.

Subsequently, if a history information request message is received from the hub portal 530 in Step 550, the service provider server 520 uploads the requested history information in Step 555. The service provider server 520 uploads the information on the user who has updated the data. The hub portal 530 sorts and saves the history information uploaded by the service provider server 520 by user in Step 560.

The user-specific terminal 510 requests the hub portal 530 for connection thereto in Step 565. The user-specific terminal 510 also transmits the registered user information to the hub portal 530 to request for the connection. If the connection is authorized with the user information, the user-specific terminal 510 connects to the service provider server 520. Subsequently, the hub portal 530 provides the user-specific terminal 510 with the retained integrated history information in Step 560. That is, the hub portal 530 checks the user information transmitted by the user-specific terminal 510 and sends the user-specific terminal 510 all of the history information sorted by user information. The user-specific terminal 510 displays the received integrated history information by creation time and by terminal in Step 575.

Figure 6:
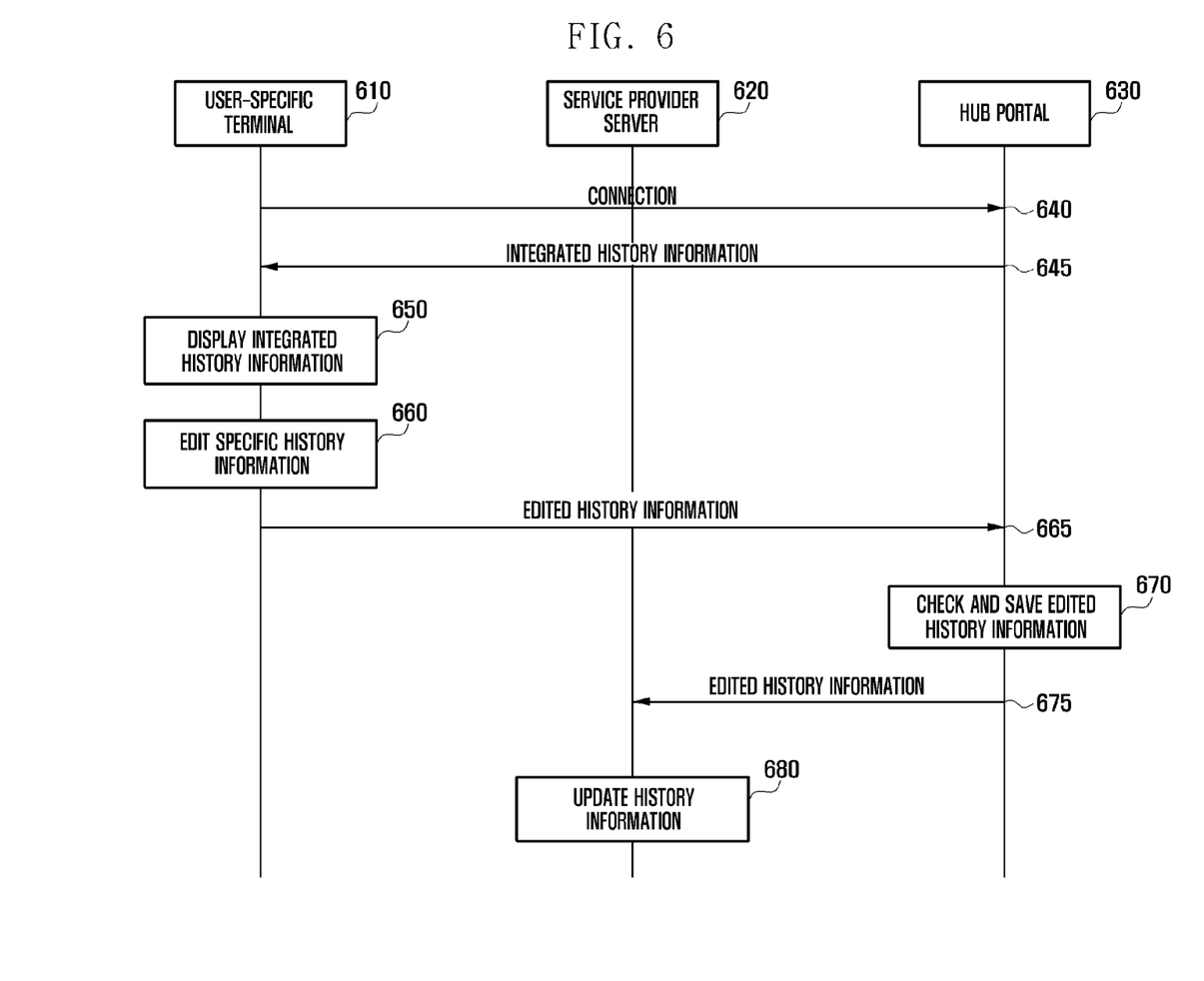
FIG. 6 is a signaling diagram illustrating signal flows among the entities of the data management system in the data update method according to an embodiment of the present invention.

FIG. 6 is a signaling diagram illustrating signal flows among the entities of the data management system in the data update method according to an embodiment of the present invention. FIG. 6 is directed to the method for displaying the integrated history information and editing the selected history information.

Referring to FIG. 6, the user-specific terminal 610 requests the hub portal 630 for connection in Step 640. The user-specific terminal 610 transmits the registered user information to the hub portal 630. If the connection to the hub portal 630 is allowed with the user information, the user-specific terminal 610 connects to the hub portal 630. The hub portal 630 provides the user-specific terminal 610 with the stored integrated history information in Step 645. That is, the hub portal 630 checks the user information transmitted by the user-specific terminal 610 and sends the user-specific terminal 610 all of the history information sorted by the corresponding user information.

The user-specific terminal 610 sorts and displays the receiving history information by creation time and by terminal in Step 650. Subsequently, if a certain history information is selected and edited by the user in Step 660, the user-specific terminal 610 uploads the edited history information to the hub portal 630 in step 665. The hub portal 630 checks the edited history information and updates the corresponding history information in Step 670.

The hub portal 630 determines whether the edited history information is related to the data generated by the terminal or the service provider server. If the edited history information is related to the data generated by the service provider server 620, the hub portal 630 transmits the edited history information to the corresponding service provider server 620 in Step 675. Upon receipt of the edited history data, the service provider server 620 updates the previously stored history information with the edited history data received from the hub portal 630.

For example, if the user has modified a reply to the data posted to a Twitter page with the displayed history information, then the user-specific terminal 610 generates data on the reply modified by the user. Subsequently, the user-specific terminal 610 transmits the history information on the generated data to the hub portal 630. The hub portal 630 checks and saves the received history information and sends this information to the service provider server 620 managing the Twitter. The service provider server 620 changes the replay to the corresponding data according to the corresponding history information after checking the user information. Although the history information, as described above, is edited by the user-specific terminal 610 is reflected to the service provider server 620, the user-specific terminal may also connect to the service provider server 620 according to the edited history information and edit the data corresponding to the edited history information. Subsequently, the user-specific terminal 610 transmits the edited history information to the hub portal 630. The hub portal 630 updates the corresponding history information with the received history information.

Figure 7:
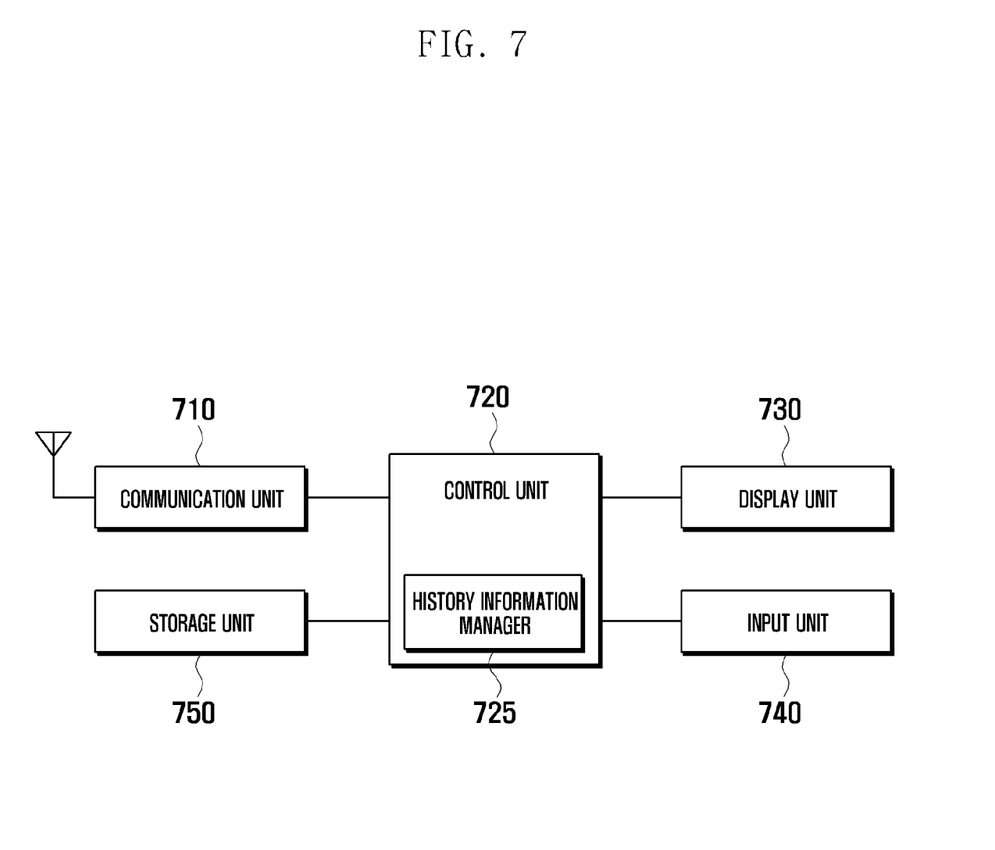
FIG. 7 is a block diagram illustrating a configuration of the terminal according to an embodiment of the present invention.

FIG. 7 is a block diagram illustrating a configuration of the terminal according to an embodiment of the present invention.

Referring to FIG. 7, the terminal includes a communication unit 710, a control unit 720, a display unit 730, an input unit 740, and a storage unit 750.

The communication unit 710 is responsible for communication with a base station. That is, the communication unit 710 establishes a communication channel with a base station for data communication such as voice communication, video communication, text messaging, and image transferring. Thus, the communication unit 710 includes an RF transmitter for up-converting and amplifying the signal to be transmitted and an RF receiver for low noise amplifying and down-converting the received signal. The communication unit 710 also communicates data with another terminal through local area communication. The communication unit 710 establishes a connection with the service provider server or the hub portal to communicate data under the control of the control unit 720.

The control unit 720 controls the overall operations and configuration of the function blocks of the terminal. Here, the control unit 720 controls the communication unit 710 to upload the data generated by a selected function to the hub portal. The control unit 720 controls the communication unit 710 to establish a connection to the hub portal in response to a user request. The control unit 720 also controls the communication unit 710 to transmit the generated data to the hub portal. The control unit 720 transmits the history information on the corresponding data as well as the data itself. In order to accomplish this, the control unit 720 includes a history information manager 725.

The history information manager 725 generates history information on the generated data. The history information includes information on data creation time and terminal which generated the data. If an integrated history information display menu item is selected by the user, the information manager 725 controls the communication unit 710 to transmit the integrated history information request message to the hub portal. The history information manager 725 transmits the user information along with the integrated history information request message. The user information includes the user ID and email registered in the registration process with the hub portal.

The history information manager 725 checks the integrated history information received from the hub portal and displays the integrated history information on the display unit 730. The history information manager 725 controls the display unit 730 to display the history information included in the integrated history information by date and by terminal. The history information manager 725 supports editing the history information selected by the user among the history information. The history information manager 725 controls the display unit 730 to display the edited history information. The history information manager 725 controls the communication unit 710 to transmit the history information to the hub portal or service provider server.

The display unit 730 displays the information input by and provided to the user as well as various menus of the terminal. The display unit may be implemented as a Liquid Crystal Display (LCD) and equipped with touchscreen as a part of the input unit 740. The display unit 730 displays the integrated history information transmitted by the hub portal under the control of the control unit 720.

The input unit 740 generates various input signals to the control unit 720 in response to the user input. The input unit 740 may be implemented in the form of a keypad or a touch sensor.

The storage unit 750 stores the programs for operating the components constituting the UE and data generated by the programs under the control of the control unit 720.

Although not illustrated in the drawings, the UE may further include other components, such as a camera module for taking picture, a digital broadcast receiver for receiving digital broadcast data, and an audio processing unit for processing audio data including voice data.

The terminal described above uploads the data generated by the user to the hub portal and displays the integrated history information received from the hub portal. Accordingly, the user can check the functions executed by the terminals owned by the user in an integrated manner.

Figure 8:
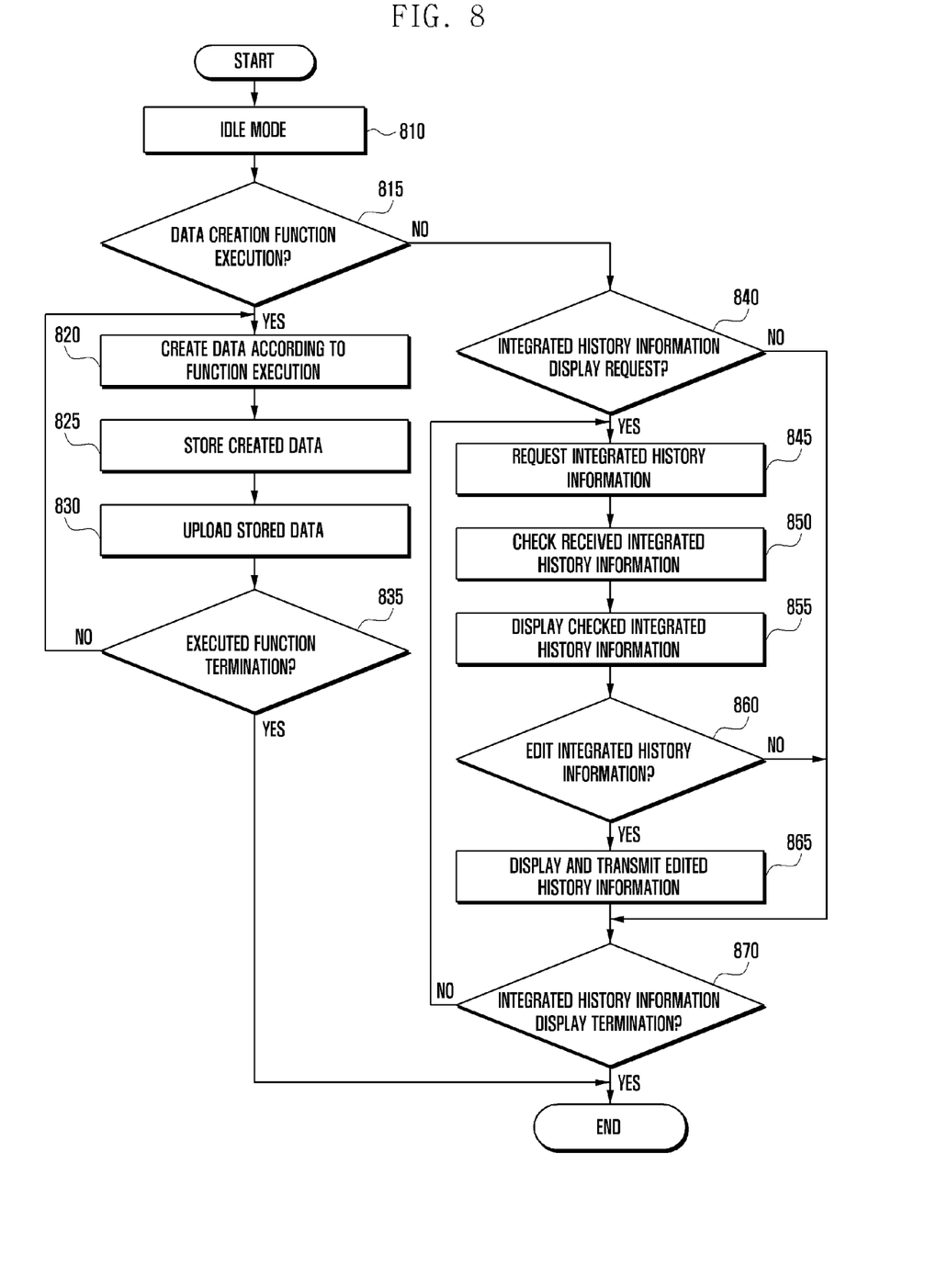
FIG. 8 is a flowchart illustrating a data display method of the terminal according to an embodiment of the present invention.

FIG. 8 is a flowchart illustrating a data display method of the terminal according to an embodiment of the present invention.

Referring to FIG. 8, the terminal operates in idle mode in Step 810. In the idle mode, the terminal is monitoring to detect a user command input for executing a data generation function in Step 815. Here, the data generation function is the function generating certain data such as the camera function for still and motion picture capture, an Internet service function for use of the service provided by a service provider server, the messaging function for transmitting and receiving text messages, and a document composition function for creating text data.

If a user input command for executing a data generation function is detected, the UE generates data according to the selected function in Step 820. Subsequently, the terminal stores the generated data in Step 825. The terminal also uploads the stored data to the hub portal in Step 830. The procedure for uploading the data to the hub portal is explained in detail with reference to FIGS. 1 to 7.

Briefly, the terminal connects to the hub portal according to the user input. The terminal transmits the user information to the hub portal. If the connection is authorized with the user information, the UE connects to the hub portal. Subsequently, the terminal transmits the generated data to the hub portal. The UE transmits the history information on the data as well as the data itself. The history information includes the data creation time and information on the terminal which has generated the data. The terminal is monitoring to detect a function termination command input in Step 835. If not, function termination command is detected, the terminal returns to Step 820.

In Step 815, if a user command input for executing a data generation function is not detected in Step 815, the terminal determines whether a user command input for displaying the integrated history information is detected in Step 840. If a user command input for displaying the integrated history information is detected, the terminal transmits an integrated history information request message to the hub portal in Step 845. The terminal transmits the integrated history information request message along with user information. The user information includes the user ID and email used in the registration process with the hub portal.

Subsequently, the terminal checks the integrated history information received from the hub portal in Step 850 and displays the checked integrated history information on the display unit in Step 855. The terminal displays the history information included in the integrated history information ordered by creation date and creating terminal. Subsequently, the terminal determines whether an integrated history information editing menu is selected in Step 860. If the integrated history information editing menu is selected, the terminal edits the history information selected by the user, displays the edited history information on the display unit and transmits the edited history information to the hub portal or corresponding service provider server in Step 865. If the edited history information matches the data stored in the terminal, the terminal replaces the old data with the edited history data and transmits the updated history information to the hub portal. Subsequently, the terminal determines whether the integrated history information display termination command is input in Step 870. If not, integrated history information display termination command is input, the terminal repeats Step 845 and the following steps until the integrated history information display termination command is detected.

Figure 9:
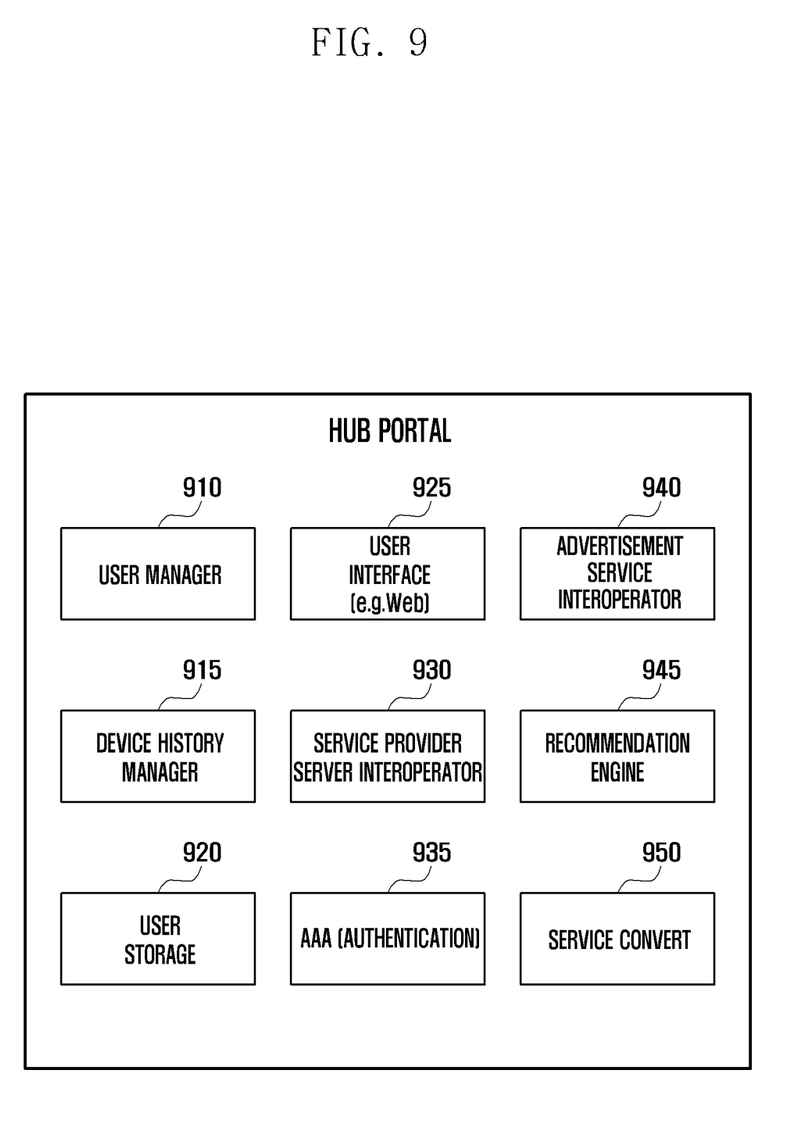
FIG. 9 is a block diagram illustrating a configuration of the hub portal according to an embodiment of the present invention.

FIG. 9 is a block diagram illustrating a configuration of the hub portal according to an embodiment of the present invention.

As illustrated in FIG. 9, the hub portal includes a user manager 910, a device history manager 915, a user storage 920, a user interface 925, a service provider server interoperator 930, an Authentication, Authorization, and Accounting unit (AAA) 935, an advertiser service interoperator 940, a recommendation engine 945, and a service converter 950.

Through the user manager 910, the hub portal manages the user information with the user ID and email address used in the user registration process. The hub portal also manages the terminal identity information registered by the user and the user profile.

Through the user manager 910, the hub portal manages history information on the user-generated data by terminal and by service provider server. That is, the hub portal sorts the history information on the generated data by user information. The hub portal also stores the history information, in the order of the creation date.

Through the user storage 920, the hub portal provides storage for storing various formats of data generated by the user. Here, the data includes MP3 data, motion picture data, still picture data, and text data.

Through the user interface 925, the hub portal provides a service page such as webpage per user. The hub portal also interoperates with the service provider server providing the terminal with various services such as Twitter and Facebook through the service provider server interoperator 930.

The hub portal provides the security-related functions such as user and terminal authentication through the AAA 935. The hub portal also provides various advertisement services based on the user information through the advertisement service interoperator 940. The hub portal recommends the services provided based on the registered user information through the recommendation engine 945. Finally, the hub portal converts the service provided by transcoding to match with the characteristic of the registered user-specific terminal through the service converter 950.

Using the aforementioned functions, the hub portal is capable of storing the history information on the data uploaded by the registered terminal and service provider server in an integrated manner. The hub portal provides the integrated history information by a user according to the user request.

Figure 10:
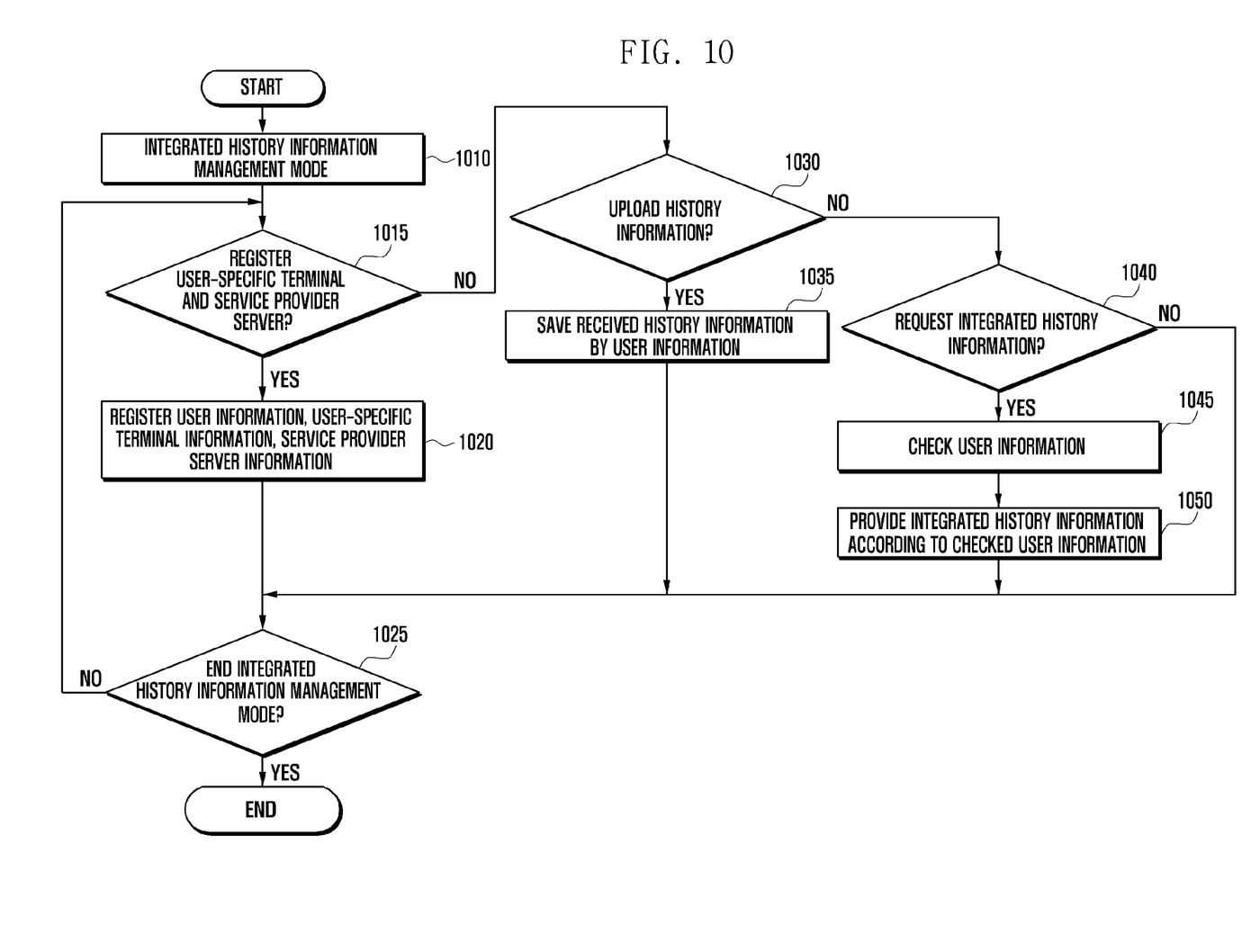
FIG. 10 is a flowchart illustrating a data management method of the hub portal according to an embodiment of the present invention.

FIG. 10 is a flowchart illustrating a data management method of the hub portal according to an embodiment of the present invention.

Referring to FIG. 10, the hub portal operates in the integrated history information management mode in Step 1010. The hub portal determines whether user information registration is requested by one of a user-specific terminal and the service provider server in Step 1015. If the user information registration is requested, the hub portal registers at least one of the user information, user-specific terminal information and service provider server information in Step 1020. Subsequently, the hub portal determines whether the integrated history information management mode termination command is input in Step 1025. If not, the integrated history information management mode termination command is input, the hub portal repeats Step 1015.

In Step 1015, if the integrated history information management mode termination command is input, the hub portal determines whether a history information upload command is input in Step 1030. Although not illustrated in the drawings, the hub portal requests the user-specific terminal or the service provider server for upload of the user information and history information. Whenever new data is generated, the hub portal determines whether any history information transmitted by the user-specific terminal or the service provider server is received and whether the history information upload is requested.

If the history information upload is requested, the hub portal sorts the received history information by user information and stores the per-user information as integrated history information. In other words, the hub portal checks the user information transmitted in the history information upload. The hub portal determines whether the checked user information matches with the registered user information. If the user information is the registered user information, the hub portal stores the received history information along with the user information. The hub portal arranges the history information ordered by creation date. Subsequently, the hub portal sorts the history information by terminal created the data corresponding to the history information.

In Step 1030, if the integrated history information management mode termination command is not input, the hub portal determines whether an integrated history information request message is received in Step 1040. If the integrated history information request message is received, the hub portal checks the user information transmitted along with the integrated history information request message in Step 1045. Subsequently, the hub portal provides the UE which has transmitted the integrated history information request message with the integrated history information according to the identified user information in Step 1050.

As described above, the data management system and method of the present invention enables the user to check the functions executed by the terminals owned by the user in an integrated manner. Also, the data management system and method of the present invention is capable of managing the data generated by multiple diverse terminals and service provider server efficiently in an integrated manner.

Although various embodiments of the present invention have been described in detail herein, it will be apparent to those skilled in the art that various changes in form and detail may be made without departing from the spirit and scope of the present invention, as defined by the appended claims.

What is claimed is:

1. A user information management method for a hub server connected to at least one of terminals and at least one of service provider servers, comprising:
registering user information for the at least one of the terminals and the at least one of the service provider servers, wherein the at least one of the terminals and the at least one of the service provider servers are registered in the hub server;
receiving history information including data created by a user, wherein the history information is transmitted by the at least one of the registered terminals and the registered service provider servers of the user;
generating integrated history information using the received history information based on the at least one of the registered terminals at which the user creates the data;
transmitting the integrated history information in response to an integrated history information request message received from one of the at least one of the registered terminals;
updating the generated integrated history information, if at least one history information included in the generated integrated history information is edited; and
transmitting the updated integrated history information to the at least one of the registered terminals and the registered service provider servers that transmitted the at least one history information,
wherein the received history information included in the integrated history information is displayed with information of the at least one of the registered terminals at which the user creates the data.

2. The user information management method of claim 1, further comprising transmitting a history information request message to the at least one of the registered service provider servers.

3. The user information management method of claim 2, wherein the history information request message transmitted to the at least one of the registered service provider servers is transmitted at a predetermined time period.

4. A server apparatus connected to at least one of terminals and at least one of service provider servers to manage information on a user, comprising:
a transceiver, configured to:
receive user registration information for the at least one of the terminals and the at least one of the service provider servers, wherein the at least one of the terminals and the at least one of the service provider servers are registered in the hub server, and
receive history information including data created by the user transmitted by at least one of the at least one of the terminals and the at least one of the service provider servers of the user;
a controller, configured to:
register the at least one of the terminals and the at least one of the service provider servers based on the user registration information, and
update stored integrated history information, if at least one history information included in the stored integrated history information is edited; and
a storage unit, configured to store integrated history information generated using the history information based on the at least one of the registered terminals at which the user creates the data,
wherein the transceiver is further configured to:
transmit the integrated history information stored in the storage unit in response to an integrated history information request message received from one of the at least one of the registered terminals, and
transmit the updated integrated history information to the at least one of the registered terminals and the registered service provider servers that transmitted the at least one history information, and
wherein the received history information included in the integrated history information is displayed with information of the at least one of the registered terminals at which the user creates the data.

5. The server apparatus of claim 4, wherein the transceiver is further configured to transmit a history information request message to the at least one of the registered service provider servers.

6. The server apparatus of claim 5, wherein the transceiver is further configured to transmit the history information request message transmitted to the at least one of the registered service provider servers at a predetermined time period.

7. A user information management method of a terminal connected to a hub server, comprising:
transmitting user information for the terminal to the hub server;
transmitting history information including data created by a user to the hub server;
receiving integrated history information generated using the history information based on the terminal at which the user creates the data;
displaying the history information included in the received integrated history information with information of the terminal at which the user creates the data;
editing at least one history information of the received integrated history information; and
transmitting the edited at least one history information to the hub server in response to an edit command of the hub server.

8. The user information management method of claim 7, further comprising transmitting an integrated history information request message to the hub server.

9. The user information management method of claim 7, further comprising displaying the received integrated history information according to the user information.

10. A terminal connected to a hub server to manage user information, comprising:
a transceiver; and
a control unit configured to:
control the transceiver to transmit user information for the terminal and history information including data created by a user to the hub server and to receive integrated history information generated using the history information based on the terminal at which the user creates the data,
display the history information included in the received integrated history information with information of the terminal at which the user creates the data,
edit at least one history information of the received integrated history information, and
transmit the edited history information to the hub server in response to an edit command of the hub server.

11. The terminal of claim 10, wherein the control unit is further configured to control the transceiver to transmit an integrated history information request message to the hub server.

12. The terminal of claim 10, further comprising an input unit, configured to receive an edit command for editing at least one history information of the received integrated history information, wherein the transceiver is further configured to transmit the edited history information to the hub server according to the edit command.

13. The terminal of claim 10, further comprising a display unit configured to display the received integrated history information according to the user information at a predetermined time period.

* * * * *